United States Patent [19]

Miller et al.

[11] 4,046,109
[45] Sept. 6, 1977

[54] IMPLEMENTS FOR SUCH USES AS ANIMAL GROOMING, FISH SCALING, AND VEGETABLE GRATING

[76] Inventors: Harry R. Miller, 751 Potomska Road; Paul A. Borba, 626 Smith Neck Road, both of South Dartmouth, Mass. 02748

[21] Appl. No.: 553,670

[22] Filed: Feb. 27, 1975

[51] Int. Cl.² .............................................. A01K 13/00
[52] U.S. Cl. ......................................... 119/92; 17/69; 30/304; 145/108 R
[58] Field of Search .................................. 119/83–94; 17/66, 69, 63; 16/DIG. 24, 25, 114 R, 119; 15/142, 145, 236; 30/172, 279, 300, 304; 279/101–105, 95, 96; 145/31 A, 31 AB

[56] References Cited

U.S. PATENT DOCUMENTS

| 348,067 | 8/1886 | Spear | 119/85 |
|---|---|---|---|
| 516,520 | 3/1894 | Butterworth | 119/94 |
| 962,667 | 6/1910 | Rahn | 119/92 |
| 2,609,020 | 9/1952 | Becker | 145/108 R |
| 2,800,879 | 7/1957 | Quick | 119/92 |
| 3,160,142 | 12/1964 | Torow | 119/92 |
| 3,270,368 | 9/1966 | Cook, Sr. et al. | 30/304 |
| D. 23,872 | 12/1894 | Kellogg | 119/86 |

*Primary Examiner*—Robert Peshock
*Assistant Examiner*—Peter K. Skiff

[57] ABSTRACT

Implements for use in grooming animals, scaling fish, and grating vegetables have at least one blade of the band saw type which includes a loop portion and tail portions and a handle of a material that the blade teeth will cut and having a socket. Each socket is dimensioned slidably to receive the tail portions, if held sufficiently close together, but to be frictionally engaged thereby if not so held after their insertion into the socket and to become engaged by the teeth of the tail portions on any relative movement between them and the handle. The loops are of a shape depending on the primary use of the implement. In the case of animal grooming and fish scaling implements there are several loops, one inside another.

3 Claims, 20 Drawing Figures

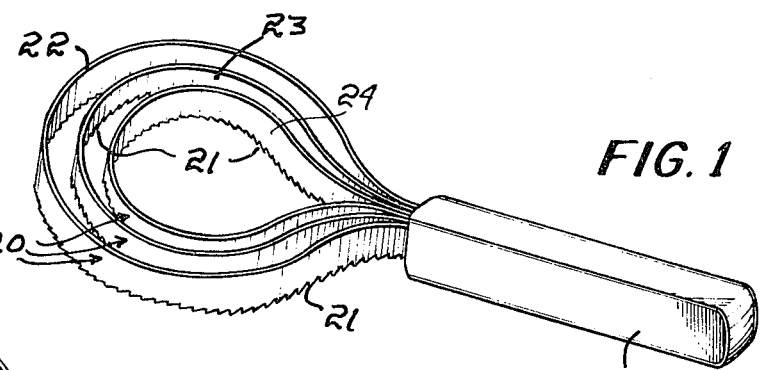
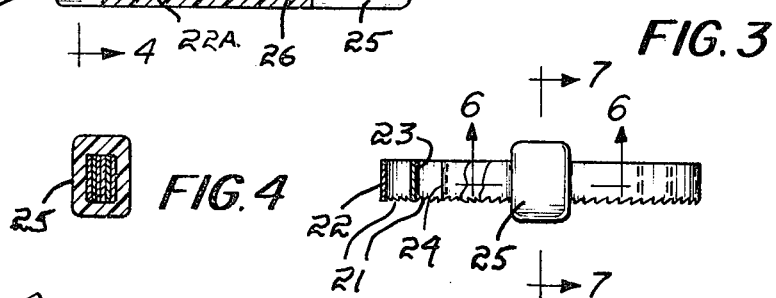
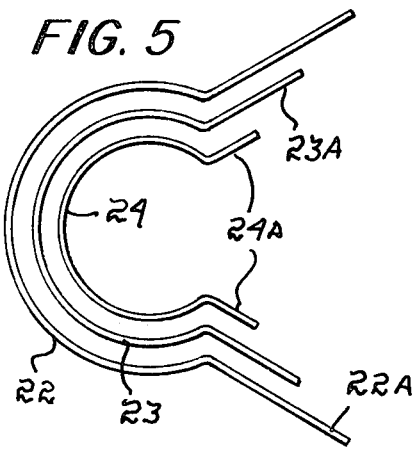
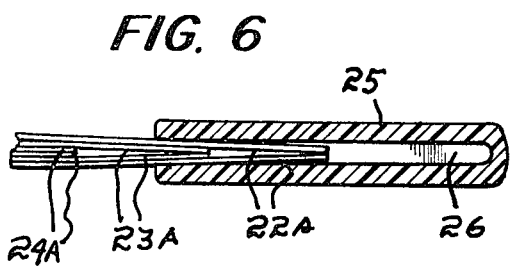
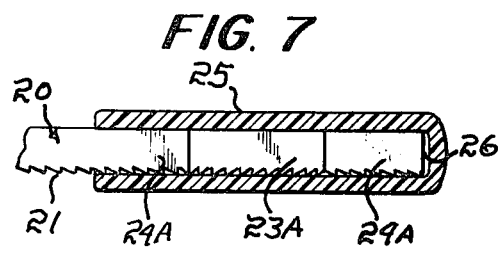
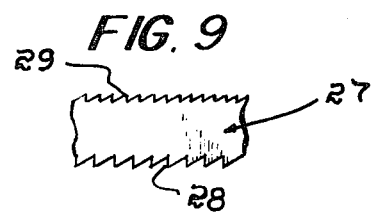

IMPLEMENTS FOR SUCH USES AS ANIMAL GROOMING, FISH SCALING, AND VEGETABLE GRATING

BACKGROUND REFERENCES

U.S. Pat. No. 407,313
U.S. Pat. No. 484,848
U.S. Pat. No. 522,578
U.S. Pat. No. 539,186
U.S. Pat. No. 689,760
U.S. Pat. No. 2,449,092
U.S. Pat. No. 2,800,879
U.S. Pat. No. 3,852,843

BACKGROUND OF THE INVENTION

Implements of various types have been made available for such diverse uses as animal grooming, vegetable grating and fish scaling.

One type of implement commonly proposed for use in animal grooming had one or more variously shaped, looped blades with a handle attached thereto and with the loops formed from spring steel stock having teeth extending along one or both of its edges.

As far as we are aware, no construction has been proposed that provides a looped blade and handle combination enabling production and use requirements to be fully met with the loop or loops of a shape appropriate for the intended use of the implement of which they are a part.

THE PRESENT INVENTION

The general object of the present invention is to provide implements, particularly for the above indicated purposes, that enable production and use requirements to be met with the implements including one or more handle supported loops of band saw blade stock or the like.

In accordance with the invention, this objective is attained with an implement including a handle having a socket in one end and at least one blade of said stock and including a loop portion and tail portions. The handle is of a material that can be cut by the teeth of the blade, and its socket is dimensioned to slidably receive the tail portions of the blade, if held sufficiently close together, and to be frictionally engaged thereby if not so held after their insertion into the socket, and the teeth of the tail portions cut into the wall of the socket on any relative movement between the tail portions and the handle thereby locking the tail portions within the handle. Where the teeth of the blade or blades have a set, the teeth of abutting tail portions become interlocked.

Another objective of the invention is to ensure that the tail portions are in secure frictional engagement with the walls of the socket, an objective attained by providing each blade as a preform with its tail portions spaced apart and inclined away from each other.

Another object of the invention is to ensure effectiveness by using a plurality of blades, an objective attained with loop portions of substantially the same shape, one inside the other with the loops spaced apart but with the space between them decreasing towards the handle and a particular objective is to form the blades with tail portions of different lengths, the longer ones the tail portion of the outside blade thus providing a tapered assembly of tail portions when held together for insertion into the socket of the handle.

Another objective of the invention is to utilize a multi-bladed implement in animal grooming, an objective attained with each loop portion substantially tear-shaped, preferably with three blades, and another objective is to utilize such a multi-bladed implement as a fish scaler, an objective attained with each portion substantially in the form of an isosceles triangle.

Yet another objective of the invention is to provide an implement in which its blade is adapted for use as a vegetable grater, an objective attained with a blade preform such that when its tail portions are caught within the socket of the handle, it is substantially in the form of an isosceles triangle the base of which has a central recess of U-shape against the closed end of which the sides of the loop bear.

BRIEF DESCRIPTION OF THE DRAWINGS

In the accompanying drawings, illustrative embodiments of the invention are shown of which FIG. 1 is a perspective view of an animal grooming implement;

FIG. 2 is a plan view thereof with the handle partly broken away;

FIG. 3 is a partly sectioned end view of the implement;

FIG. 4 is a section taken approximately along the indicated line 4—4 of FIG. 2;

FIG. 5 is a plan view of a set of preformed, loop-forming blades;

FIG. 6 is a like view but with the tail portions of the blades held together for insertion into the handle socket;

FIG. 7 is a section taken lengthwise of the handle illustrating the insertion of the tail portions of the blades and their anchoring therein;

FIG. 8A is a fragmentary view of a blade having teeth of the hook tooth type;

FIG. 8B is a like view but with the blade teeth of the skip type;

FIG. 9 is a like view of a blade having teeth formed along both edges but each having a different number per inch;

THE PREFERRED EMBODIMENTS OF THE INVENTION

Figure 10:
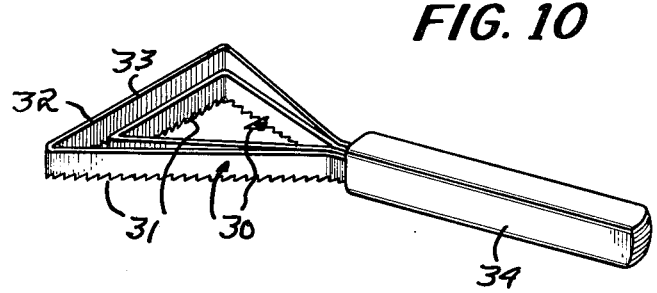
FIG. 10 is a perspective view of a fish scaling implement.

The embodiment of the invention illustrated by FIGS. 1 - 9 is an animal grooming implement particularly adapted for use in grooming horses and has three blades preformed from appropriate lengths of band saw blade stock 20 having a series of teeth 21 extending from end-to-end thereof to provide loop portions generally indicated at 22, 23, and 24 that are generally tear-shaped, and outwardly flared tail portions 22A, 23A, and 24A, respectively. While the blades are shown as formed from the same stock, each may differ from the others as to the number of teeth per inch, the type of the teeth, and their direction. It is preferred, however, that the direction of the teeth of at least one blade, preferably the blade from which the loop portion 23 is formed by reversed relative to the direction of the teeth of the other blades. A handle 25 has a socket 26 in one end receiving the tail portions of the blades. The handle 26 is of a material that the teeth 21 of the blades will cut and is desirable molded from a suitable plastic, vinyl, having proved to be satisfactory for that purpose, and the socket 26 is in the form of a slot.

The lengths of the blade stock from which the blades are formed are such that the blades may be assembled with the loop portion 23 within the loop portion 22 and the loop portion 24 within the loop portion 23 and with the three loop portions spaced a substantial distance apart but with the space between them decreasing towards the handle 25. The tail portions 22A, 23A, and 24A are of different lengths so that when assembled and held sufficiently close together for insertion into the socket 26, the assembly tapers in thickness towards the free ends of the tail portion and as shown, the tail portions 22A are the longest.

While the assembled tail portions when tightly held together may be readily forced into and seated in the socket 26, when released, they are a tight fit therein and any relative movement between them and the handle results in their teeth biting into the wall of the socket and with the teeth of abutting tail portions interlocking if they have a set, so that tail portions and the handle 25 become securely and positively interconnected.

In the use of the grooming implement, the loop portions are free to move not only side-to-side relative to each other but also vertically relative to their normal planes. As a consequence, the "attack" of each blade is usually somewhat different from that of the others. When moving the implement against the coat of an animal, even along a more or less straight path, with the direction of the teeth of the loop portions alternately reversed, a side-to-side movement of the loop portions relative to each other results that renders the implement highly effective. As a consequence, an animal, a horse, for example, may be brushed quickly and thoroughly cleaned and the side-to-side resilience of the loop portions results in removed matter being ejected from the implement and any accummulation can be easily knocked free.

While the number of teeth per inch of the blade may be in the approximate range of from eight to thirty-two teeth per inch, best results are attained with teeth within the 10 to 18 teeth per inch range.

If desired, and as shown in FIG. 9, special blade stock 27 may be used having a series of teeth 28 extending along one edge and a second series of teeth 29 extending along its other edge, each series having a number of teeth per inch of blade differing from that of the other series.

Figure 11:
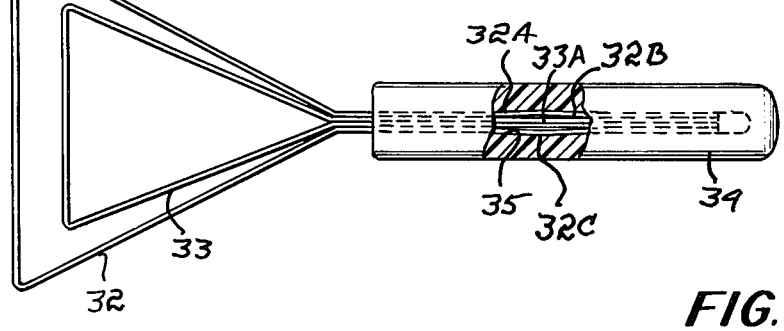
FIG. 11 is a plan view thereof with the handle partly sectioned to show the tails of the loops.
Figure 12:
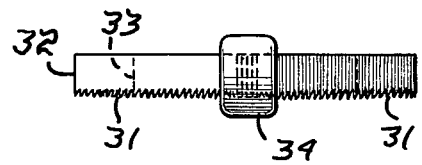
FIG. 12 is a view of the implement as seen from the handle end thereof.
Figure 13:
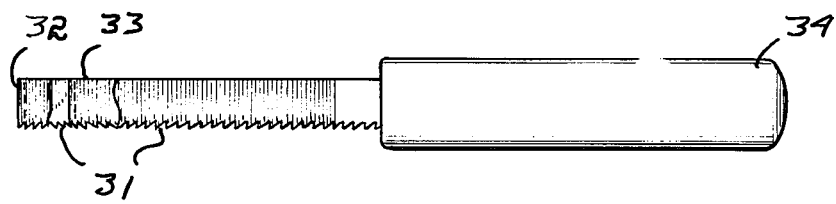
FIG. 13 is a partly sectioned side view of the implement.
Figure 14:
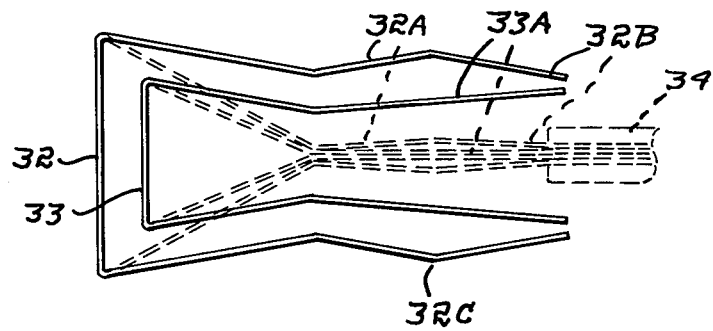
FIG. 14 is a plan view of the assembled preformed, loop-forming blades.

The implement illustrated by FIGS. 10 – 14 is particularly adapted for use in scaling fish and has two blades preformed from appropriate lengths of band saw blade stock 30 having a series of teeth 31 extending along one edge and providing preformed loop portions 32 and 33 and tail portions 32A and 33A, respectively. The blade stock 30 may be identical to the blade stock 20 and again the blade stock used for one blade may be of a blade stock differing therefrom as to the features previously referred-to but it is preferred that the teeth of the loop portions extend in opposite directions. The loop portions 32 and 33 are generally of the shape of an isosceles triangle and desirably that of an equilateral triangle. A handle 34 has a socket 35 in one end that is in the form of a slot and except for dimensions, the handle 34 and the handle 25 may be identical.

The lengths of the blade stock from which the blades are formed are such that the triangular loop portion 33 fits freely within the loop portion 32 but with the space between them decreasing towards the handle 34. When the blade stock is preformed, the tail portions 32A and 33A are both inclined away from each other. Desirably, the tail portions 32A terminate in an inwardly disposed position 32B providing an intermediate outwardly disposed bend 32C. When the two blades are assembled and the tail portions held together, they may be inserted into and seated in the socket 35 and when released, their free ends are resiliently engaged with the wall of the socket 35 and their teeth becoming caught therein on any relative movement between the handle 34 and the tail portions of the two blades. Because of the formation of the tail, particularly those of the outer tail portions, the socket dimensions may be the same as those of the animal grooming implement and still establish a secure interlock with the tail portions.

In use and as in the case of the grooming implement, the loop portions are free to move side-to-side and also to be upset, in contact with a fish, from their normal plane whereby the inner loop portion first engages scales and then any remaining are engaged by the outer loop under somewhat greater pressure.

Figure 15:
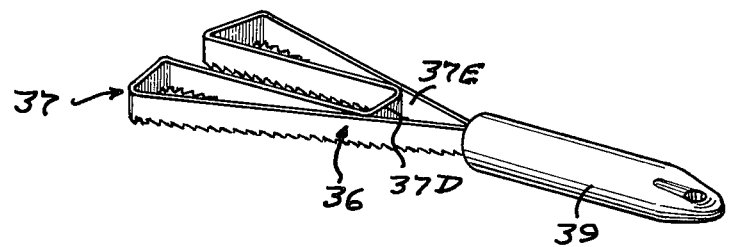
FIG. 15 is a perspective view of a vegetable grating implement.
Figure 16:
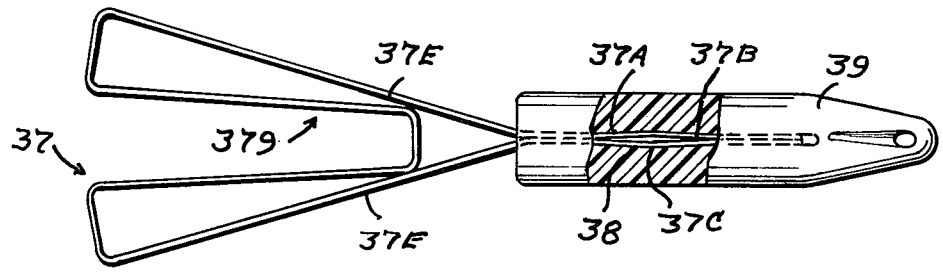
FIG. 16 is a plan view thereof with the handle partly broken.
Figure 17:
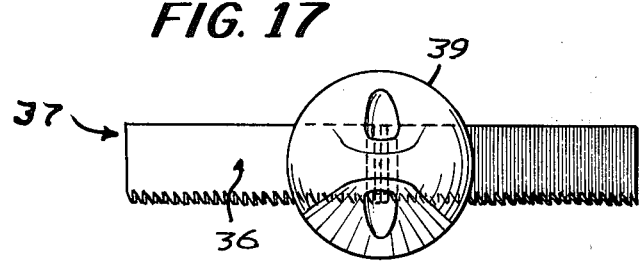
FIG. 17 is a view of the implement as seen from the handle end.
Figure 18:
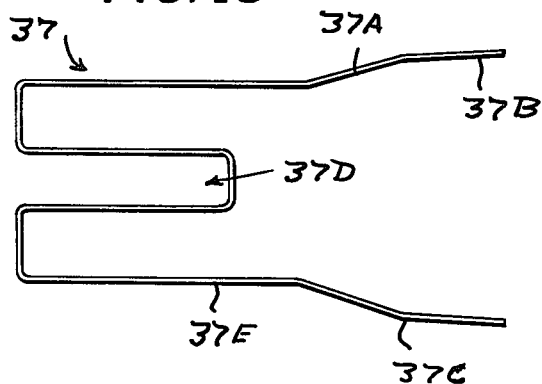
FIG. 18 is a plan view of the preformed loop.
Figure 19:
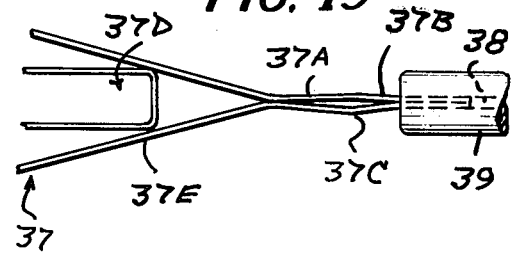
FIG. 19 is a plan view of the loop of FIG. 18 with its tails held together and started into the socket of the handle.

In FIGS. 15 – 19, there is illustrated a vegetable grating implement having a blade preformed from a length of blade stock 36, which may also be identical to any of the blade stocks previously referred-to. The preferred blade includes a loop portion 37 and tail portions caught in the socket 38 of a handle 39, the tail portions including outwardly flared sections 37A, inwardly inclined end sections 37B and intermediate, outwardly disposed bends 37C.

The handle 39 may be identical to the handles of the grooming and fish scaling implements but the loop portion 37, while generally in the form of an isosceles triangle has a central U-shaped section 37D in its base against the closed ends of which its sides 37E are shown as bearing when the outwardly disposed tail portions are brought together and inserted into and become seated in the socket 38 with the tail portions becoming securely connected to the handle 39 by the resiliency of the tail portions and the catching of their teeth in the wall of the socket as well as becoming interengaged, if they have a set.

It should be here noted that the teeth of the blade forming stock, in all embodiments of the invention are preferably of the skip or hook types and, as stated, it is preferred that, when two or more blades are employed, the direction of the teeth of one is reversed relative to the direction of the teeth of the other.

From the foregoing, it will be apparent that implements in accordance with the invention are well adapted to meet production requirements simply by preforming the blade or blades that each implement is to have and then holding the tail portions together while they are being fully inserted into the handle, the handle and tail portions then becoming permanently interconnected.

We claim:

1. An implement such as an animal grooming, fish scaling, and vegetable grating implement, said implement including a plurality of blades of the band saw type, each blade including a loop portion and outwardly flared tail portions, one loop portion within another and its tail portions between the tail portions thereof, and a handle having a slot-shaped socket in one end receiving all of said tail portions as a force fit assembly and with the socket side walls holding said tail portion tightly compressed with their teeth in engagement with an end wall of the socket, the handle of a material that is cut by said teeth, said tail portions shaped and dimensioned to provide that the free end of the assembly may be held for free entry into the socket, the frictional resistance of said assembly to movement lengthwise of said socket increasing towards the other end of the assembly.

2. The implement of claim 1 in which the tail portions are outwardly flared, the tail portions of any loop inside another shorter than the tail portions thereof.

3. The implement of claim 1 in which the tail portions are outwardly flared, the free ends of the outer tail portions inclined inwardly towards each other.

* * * * *